(12) United States Patent
Trowbridge

(10) Patent No.: US 10,647,197 B2
(45) Date of Patent: *May 12, 2020

(54) ROUTING HYDROSTATIC GROUND DRIVE HOSES IN A SELF-PROPELLED AGRICULTURAL PRODUCT APPLICATOR

(71) Applicant: CNH Industrial America LLC, New Holland, PA (US)

(72) Inventor: Jeffrey C. Trowbridge, Stevens, PA (US)

(73) Assignee: CNH Industrial America LLC, New Holland, PA (US)

( * ) Notice: Subject to any disclaimer, the term of this patent is extended or adjusted under 35 U.S.C. 154(b) by 210 days.

This patent is subject to a terminal disclaimer.

(21) Appl. No.: 15/850,676

(22) Filed: Dec. 21, 2017

(65) Prior Publication Data
US 2019/0193559 A1    Jun. 27, 2019

(51) Int. Cl.
| B60K 17/14 | (2006.01) |
| A01B 69/00 | (2006.01) |
| B60K 17/30 | (2006.01) |
| B60K 7/00  | (2006.01) |
| A01C 19/00 | (2006.01) |
| B60K 17/10 | (2006.01) |
| A01C 23/04 | (2006.01) |

(52) U.S. Cl.
CPC .............. *B60K 17/14* (2013.01); *A01B 69/00* (2013.01); *A01C 19/00* (2013.01); *B60K 7/0007* (2013.01); *B60K 7/0015* (2013.01); *B60K 17/10* (2013.01); *B60K 17/30* (2013.01); *A01C 23/047* (2013.01)

(58) Field of Classification Search
CPC .... B60K 17/14; B60K 17/10; B62D 49/0678; A01B 76/00; A01C 23/00
See application file for complete search history.

(56) References Cited

U.S. PATENT DOCUMENTS

| 2,820,524 | A |   | 1/1958  | Bear |
| 3,154,164 | A | * | 10/1964 | Shaw ................. B60B 27/0026  180/209 |
| 3,344,879 | A | * | 10/1967 | Glomb .................. B60K 17/10  180/55 |
| 3,458,008 | A |   | 7/1969  | Malm et al. |
| 3,469,646 | A |   | 9/1969  | O'Connor |

(Continued)

FOREIGN PATENT DOCUMENTS

| EP | 2 692 568 B1 | 2/2014 | |
| WO | 2012/035368 A | 3/2012 | |
| WO | WO-2012035368 A1 * | 3/2012 | ............. B60K 17/14 |

*Primary Examiner* — Faye M Fleming
(74) *Attorney, Agent, or Firm* — Rebecca L. Henkel; Rickard K. DeMille

(57) ABSTRACT

A ground drive hose routing system and method for a self-propelled agricultural product applicator utilize segments of a hose arrangement that are constrained to lie and move primarily in only one direction, to isolate horizontal hose movement related to track-width adjustment from vertical hose movement resulting from action of suspension members. For steerable wheels, an additional pivotable segment is utilized to accommodate turning motion while maintaining isolation between other primarily horizontally and vertically constrained movable segments of the hose arrangement.

20 Claims, 6 Drawing Sheets

(56) References Cited

U.S. PATENT DOCUMENTS

| | | | |
|---|---|---|---|
| 4,185,713 A * | 1/1980 | Williams | B60K 17/10 |
| | | | 180/242 |
| 5,082,217 A | 1/1992 | Parker et al. | |
| 5,765,650 A | 6/1998 | Checkel | |
| 6,378,279 B1 | 4/2002 | Smith et al. | |
| 6,561,535 B1 | 5/2003 | Paluch et al. | |
| 6,752,360 B2 | 6/2004 | Bennett | |
| 7,540,133 B2 | 6/2009 | Zacharias et al. | |
| 7,753,160 B2 | 7/2010 | Velke et al. | |
| 8,205,708 B2 | 6/2012 | Sakakura et al. | |
| 8,668,173 B2 | 3/2014 | Knobloch | |
| 10,266,051 B1 * | 4/2019 | Trowbridge | A01B 76/00 |

* cited by examiner

ROUTING HYDROSTATIC GROUND DRIVE HOSES IN A SELF-PROPELLED AGRICULTURAL PRODUCT APPLICATOR

FIELD OF THE INVENTION

This invention generally relates to self-propelled agricultural product applicators, and more particularly to hydrostatic ground drive systems in such applicators.

BACKGROUND OF THE INVENTION

Modern agricultural practices rely heavily on precise and timely applications of fertilizers, herbicides, pesticides and other chemicals. In situations where the applications must be made to standing row crops, such as corn or beans, liquid or granular materials are often applied using a high ground clearance, self-propelled applicator.

In order to provide maximum ground clearance, such applicators utilize highly specialized suspension and propulsion systems for connecting the ground engaging wheels of the applicator to a frame of the applicator. Typically, separate hydraulic drive propulsion motors are provided as part of the suspension and propulsion units for each drive wheel, to thereby further enhance ground clearance by minimizing the encroachment of drive train or suspension components into the space between the wheels under the applicator.

Such high ground clearance applicators also typically provide some means for adjusting the track width of the wheels to match the row spacing of the crop being treated.

Routing hydraulic lines to the hydrostatic drive motors provides significant challenges. Because the applicators are large machines carrying heavy loads across uneven terrain, the suspension and drive units must be rugged, and typically require substantial volumes of high-pressure hydraulic fluid during operation. The suspension systems are also often configured to allow adjustment of the height of the applicator above the ground below the applicator.

Action of the suspension systems, the track-width adjustment systems and pivoting motion of steerable wheels of the applicator typically require the use of hoses for providing fluid communication between the hydrostatic drive motors and a source of the pressurized hydraulic fluid mounted to the frame of the applicator. These drive hoses are large, heavy and stiff, and do not lend themselves well to motions inherent in operating the applicator, such as pivoting left and right during steering, vertical movement of the suspension system, and horizontal movement of the track-width adjustment system.

It is a challenge for designers of self-propelled agricultural product applicators to provide an efficient and effective system and method for routing the drive hoses in a manner that keeps hose runs short and direct, while still accommodating all of the various necessary movements of the drive motors relative to the frame of the applicator. It is also a challenge to rout the hoses in a manner that does not result in having the hoses interfere with related mechanisms, such as steering linkages, fenders, tires, or with the crop passing by or under the applicator.

In the past, designers of self-propelled agricultural product applicators often resorted to long hoses, routed to form large or multiple loops of hose, to accommodate all of various motions attendant with operation of the applicator. While this approach has worked, it does not provide effective or efficient solutions to the challenges described above for routing ground drive hoses.

It is desirable, therefore to provide an improved system and method for routing ground drive hydrostatic hoses in a self-propelled agricultural product applicator.

BRIEF SUMMARY OF THE INVENTION

The invention provides an improved ground drive hose routing system and method for a self-propelled agricultural product applicator, by utilizing segments of a hose arrangement that are constrained to lie and move primarily in only one direction, to isolate horizontal hose movement related to track-width adjustment from vertical hose movement resulting from action of suspension members. For steerable wheels, an additional pivotable segment is utilized to accommodate turning motion while maintaining isolation between other primarily horizontally and vertically constrained movable segments of the hose arrangement.

As used herein, the term "horizontally constrained movable hose segment" is intended to mean a hose segment that is constrained to flex and move substantially only in a horizontal direction, as if lying between a pair of horizontally extending surfaces. In similar fashion, the term "vertically constrained movable hose segment," as used herein, is intended to mean a hose segment that is constrained to flex and move substantially only in a vertical direction, as if the vertically constrained movable hose segment were routed between a pair of vertically extending surfaces.

By virtue of this approach, the drive hoses can be shorter, and more uniformly and neatly installed than in prior applicators. In addition, twisting and tangling of the hoses, experienced in prior applicators, is substantially eliminated. Ground clearance is also enhanced, and interference or entanglement with standing crops is precluded.

In one form of the invention, a ground drive hose routing system is provided for a self-propelled agricultural product applicator having a source of pressurized hydraulic fluid mounted on an applicator main frame. The main frame is supported above a ground surface by a ground engaging wheel operatively connected to the frame by an independent suspension and propulsion unit. The independent suspension and propulsion unit is mounted on a horizontally movable axle member for adjusting track width of the wheel. The suspension and propulsion unit includes a hydraulic propulsion motor that is movable horizontally with respect to the frame under action of the movable axle, and also movable vertically with respect to both the frame and the movable axle member under action of the suspension. The ground drive hose routing system includes a hydraulic hose arrangement connected in fluid communication between the source of hydraulic fluid on the frame and the propulsion motor on the independent suspension and propulsion unit.

The hydraulic hose arrangement may define a horizontally constrained movable segment and a vertically constrained movable segment of the hose arrangement. The horizontally constrained segment and the vertically constrained segment are connected in fluid communication with one another in such a manner that movements of the hose arrangement in response to horizontal movement of the axle member, and vertical movement of the propulsion motor under action of the suspension are isolated from one another.

In some forms of the invention, a ground drive hose routing system may have a first end fixedly attached to the frame, a second end fixedly attached to the propulsion motor, and an intermediate hose attachment point disposed between the first and second ends of the hose arrangement. The intermediate hose attachment point may be attached to the movable axle member in a manner constraining the horizontally constrained movable segment of the hose arrangement to lie and move primarily along a substantially horizontal plane. The intermediate hose attachment point may also be attached to the movable axle member in a manner constraining the vertically movable segment of the hose arrangement to lie and move primarily along a substantially vertical plane, to thereby isolate movements of the hose arrangement in response to horizontal movement of the axle member from movements of the hose arrangement in response to vertical movement of the propulsion motor under action of the suspension.

In some forms of the invention, the frame of the applicator may define substantially perpendicular longitudinal and transverse axes of the frame and applicator, with the longitudinal and transverse axes extending respectively between front and rear ends and left and right sides of the applicator, such that the longitudinal and transverse axes define a horizontal plane extending substantially parallel to a level ground surface under the applicator. The movable axle member may include proximal and distal ends of the movable axle member, with the proximal end being adapted for transversely movable engagement with the frame. The hydrostatic propulsion motor may be operatively connected to the distal end of the movable axle by a vertically movable independent suspension system operatively connecting the wheel and propulsion motor to the distal end of the movable axle member in a manner providing for vertical movement of the wheel and propulsion motor with respect to the distal end of the movable axle element and the frame.

A horizontally constrained movable hose segment, according to the invention, may have a first end fixedly attached to the frame, and a second end fixedly attached to the movable axle member at an intermediate hose connection point for transverse movement of the second end of the transversely movable hose segment with the movable axle member relative to the frame. The horizontally constrained hose segment may also have a length thereof constrained to lie and move in a direction substantially parallel to the horizontal plane defined by the longitudinal and transverse axes of the frame.

In similar fashion, in some forms of the invention, a substantially vertically constrained movable hose segment may have a first end fixedly attached to the movable axle member at an intermediate hose attachment point, and a second end fixedly attached to a propulsion motor for vertical movement of the second end of the vertically movable hose segment with respect to the movable axle member and the frame. The vertically constrained hose segment may also have a length thereof constrained to lie and move in a direction substantially perpendicular to the horizontal plane defined by the longitudinal and transverse axes of the frame.

In some forms of the invention, the horizontally constrained movable hose segment has a first end fixedly attached to the frame, and a second end fixedly attached to the movable axle member at the intermediate hose connection point for transverse movement of the second end of the transversely movable hose segment with the movable axle member relative to the frame. The horizontally constrained hose segment also has a length thereof constrained to lie and move in a direction substantially parallel to the horizontal plane defined by the longitudinal and transverse axes of the frame. The substantially vertically constrained movable hose segment has a first end fixedly attached to the movable axle member at the intermediate hose attachment point, and a second end fixedly attached to the propulsion motor for vertical movement of the second end of the vertically movable hose segment with respect to the movable axle member and the frame. The vertically constrained hose segment also has a length thereof constrained to lie and move in a direction substantially perpendicular to the horizontal plane defined by the longitudinal and transverse axes of the frame. The first end of the horizontally constrained hose segment is adapted for fluid connection to the source of pressurized hydraulic fluid. The first end of the vertically constrained hose segment is connected in fluid communication with the second end of the vertically constrained hose segment at intermediate hose attachment point, and the second end of the vertically constrained hose segment is connected in fluid communication to the propulsion motor, in such a manner that the ground drive hose routing system provides fluid communication between the source of pressurized hydraulic fluid and the propulsion motor.

The invention may be practiced with both non-steerable and steerable wheels, of a self-propelled agricultural product applicator.

In some forms of the invention, the hydraulic hose arrangement further includes a pivotable hose segment disposed between the horizontally and vertically constrained movable segments of the hose arrangement. This is especially advantageous in practicing the invention with steerable wheels.

Where an independent suspension and propulsion system is pivotably connected to the movable axle at a steering axis such that the wheel is steerable, the vertically constrained segment of the hose arrangement may be routed to substantially pass through the steering axis and be attached to the independent suspension and propulsion system at a second hose attachment point adjacent the steering axis, to thereby define the pivotable hose segment of the hose arrangement. The second hose attachment point may be disposed above the first hose attachment point, such that the pivotable and vertically constrained hose segments substantially loop upward over the movable axle and through the steering axis between the first hose attachment point and the propulsion motor.

The invention may also take the form of a self-propelled agricultural applicator including a ground drive hose routing system in accordance with the invention. An applicator, according to the invention may have multiple non-steerable and/or steerable wheels utilizing a ground drive hose routing system in accordance with the invention.

The invention may further take the form of a method for routing a ground drive hydrostatic hose in a self-propelled agricultural product applicator. Such a method may include connecting a hydraulic hose arrangement in fluid communication between a source of hydraulic fluid attached to the frame and the propulsion motor on an independent suspension and propulsion unit in such a manner that the hydraulic hose arrangement defines a horizontally constrained movable segment and a vertically constrained movable segment of the hose arrangement. The method may further include then further connecting the horizontally constrained segment and the vertically constrained segment in fluid communication with one another in such a manner that movements of the hose arrangement in response to horizontal movement of the axle member, and vertical movement of the propulsion motor under action of the suspension are isolated from one another.

In a method, according to the invention, the hose arrangement may have a first end fixedly attached to the frame, a second end fixedly attached to the propulsion motor, and an intermediate hose attachment point disposed between the first and second ends of the hose arrangement and attached to the movable axle member in a manner constraining the horizontally constrained movable segment of the hose arrangement to lie and move primarily along a substantially horizontal plane, and also constraining the vertically movable segment of the hose arrangement to lie and move primarily along a substantially vertical plane, to thereby isolate movements of the hose arrangement in response to horizontal movement of the axle member from movements of the hose arrangement in response to vertical movement of the propulsion motor under action of the suspension.

Some forms of a method, according to the invention, may include configuring the hydraulic hose arrangement to also include a pivotable hose segment disposed between the horizontally and vertically constrained movable segments of the hose arrangement.

In forms of the invention where the independent suspension and propulsion system is pivotably connected to the movable axle at a steering axis such that the wheel is steerable, a method, according to the invention, may further include routing the vertically constrained segment of the hose arrangement to substantially pass through the steering axis and attaching the vertically constrained segment at an intermediate point in the vertically constrained segment to the independent suspension and propulsion system at a second hose attachment point, to thereby define the pivotable hose segment of the hose arrangement.

Other aspects, objects and advantages of the invention will be apparent from the following detailed description and accompanying drawings.

BRIEF DESCRIPTION OF THE DRAWINGS

The accompanying drawings incorporated in and forming a part of the specification illustrate several aspects of exemplary embodiments of the present invention and, together with the description, serve to explain the invention. In the drawings.

While the invention is described herein with reference to certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
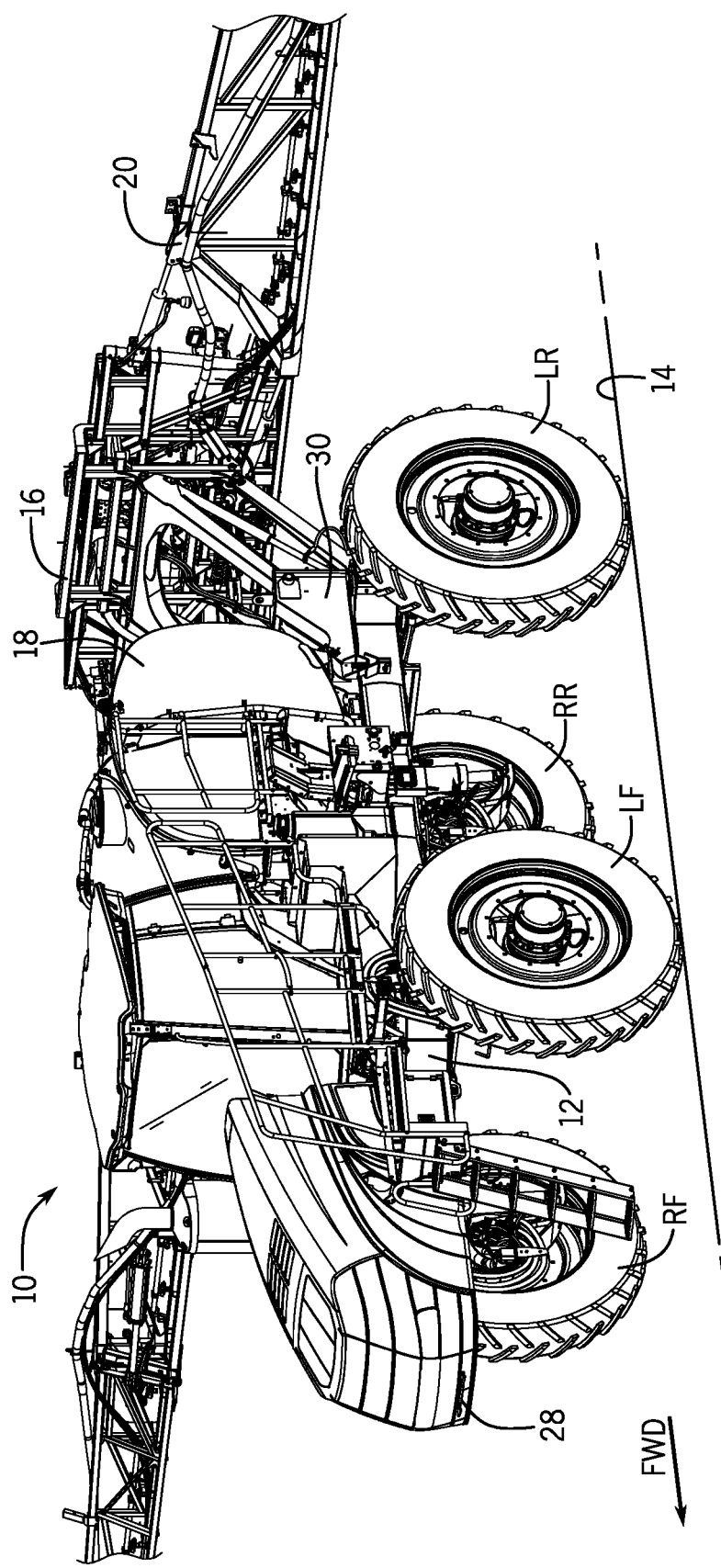
FIG. 1 is an isometric front view of an exemplary embodiment of a self-propelled agricultural applicator, according to the invention.

FIG. 1 shows an exemplary embodiment of a self-propelled agricultural product applicator 10 that includes a main frame 12 supported above a ground surface 14 by four ground engaging wheels LF,RF,LR,RR of the applicator 10. The exemplary embodiment of the applicator 10 is shown carrying a sprayer arrangement 16, having a tank 18 for carrying a liquid agricultural product, and a boom-mounted spray nozzle distribution arrangement 20.

Figure 2:
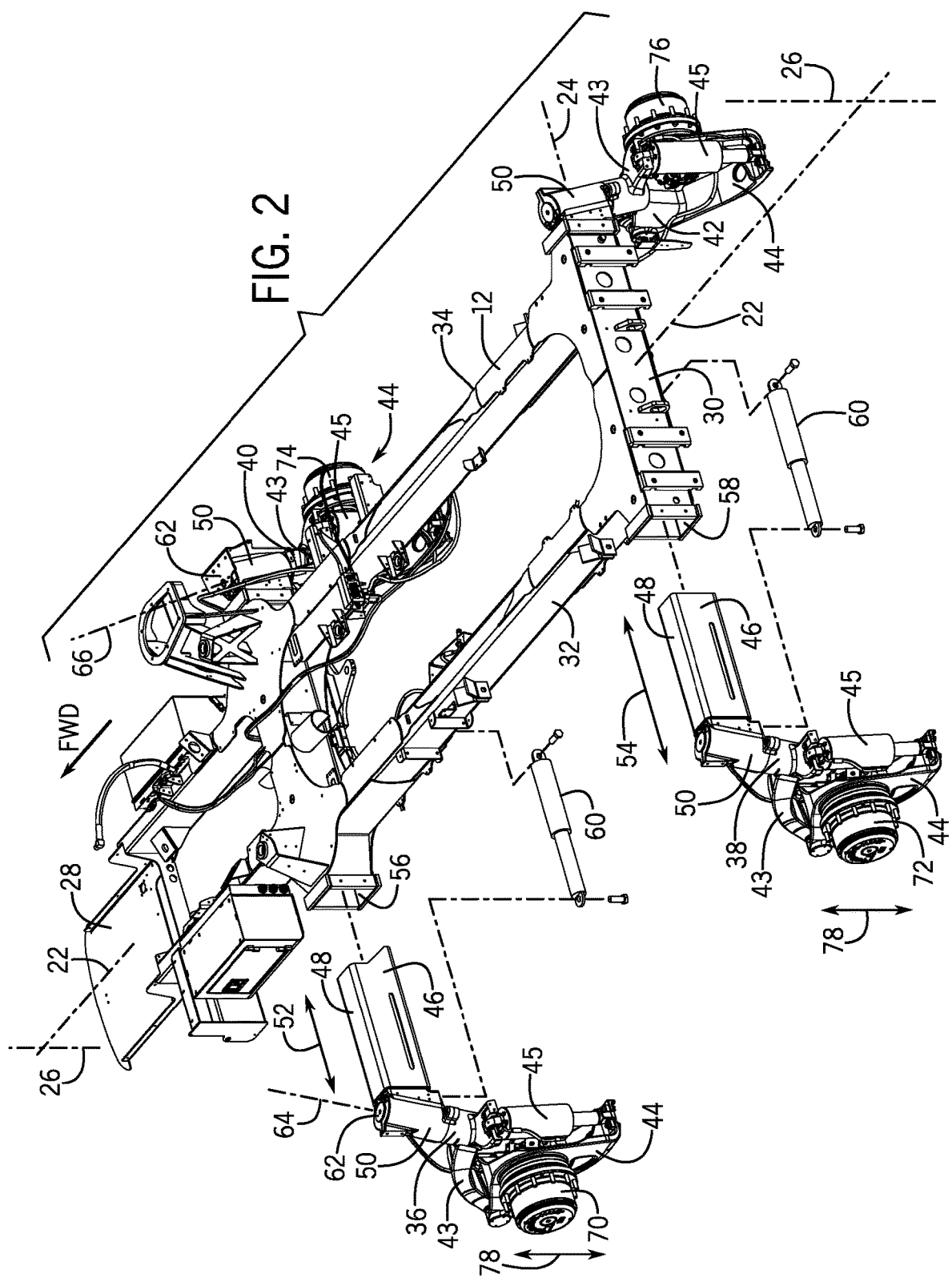
FIG. 2 is an isometric rear view of a main frame, adjustable axle members, and independent suspension and propulsion units of the self-propelled agricultural product applicator of FIG. 1.

As shown in FIG. 2, the main frame 12 defines mutually perpendicular longitudinal, transverse and vertical axes 22,24,26 of the frame 12 and applicator 10. The longitudinal and transverse axes 22,24 extend respectively between front and rear ends 28,30 and left and right sides 32,34 of the applicator 10, in such a manner that the longitudinal and transverse axes 22,24 define a horizontal plane extending substantially parallel to a level ground surface 14 under the applicator 10. The vertical axis 26, in conjunction with the horizontal plane, as defined by the longitudinal and transverse axes 22,24, defines any one of a series of vertical planes extending substantially perpendicular to the horizontal plane defined by the longitudinal and transverse axes 20,22, and substantially parallel to the vertical axis 26.

As illustrated in FIG. 2, the main frame 12 is connected to the wheels LF,LR,RF,RR by four independent suspension and propulsion units 36,38,40,42, that are each slidingly connected to the frame 12 by adjustable axle members 46, for movement in a direction substantially parallel to the transverse axis 24, in the manner specifically illustrated by arrows 52,54 in FIG. 2 for the front and rear left wheels LF,LR of the applicator 10. Each of the adjustable axle members 46 includes a proximal end 48, adapted for sliding movement within a front or a rear axle tube 56,58 of the frame 12, under action of a hydraulic track-width adjustment cylinder 60. Although the details described above are only specifically shown in FIG. 2 for the left side front and rear wheels LF,LR, it will be understood that the movable axle members 46 for the right side front and rear wheels RF,RR are configured to interface and move in the same manner, with respect to the front or a rear axle tubes 56,58 of the frame 12, under action of hydraulic track-width adjustment cylinders that are not visible in FIG. 2.

As further illustrated in FIG. 2, each of the movable axle members 46 also includes a distal end 50 adapted for receiving one of the suspension and propulsion units 36,38, 40,42. Upper suspension members 43 of the left and right rear suspension and propulsion units 38,42 are fixedly attached to the distal ends 50 of their respective movable axle members 46, and are non-steerable in the exemplary embodiment of the applicator 10. The upper suspension members 43 of the left and right front suspension and propulsion units 36,40 of the applicator 10 are attached to the distal ends 50 of their respective movable axle members 46 by steerable kingpin arrangements 62.

The steerable kingpin arrangements are configured to provide pivotable steering movement of the front wheels LF,RF about respective left and right steering axes 64,66 that extend substantially parallel to, but slightly angled from the vertical axis 26, to facilitate proper tracking and steering of the applicator 10. It will be understood, that in other embodiments of the invention, the rear wheels LR,RR might also be steerable, or the front wheels LF,RF might be fixed and the rear wheels LR,RR might be steerable.

As yet further illustrated in FIG. 2, each of the left and right front wheels LF,RF and the left and right rear wheels LR,RR are connected to a lower, vertically movable member 44 of their respective suspension and propulsion units 36,38, 40,42, by a respective wheel drive hub arrangement 70,72, 74,76, in a manner that allows the wheel drive hubs 70,72, 74,76 and wheels LF,LR,RF,RR to move vertically with respect to the distal ends 50 of the movable axle members 46 and the frame 12, as specifically illustrated by arrows 78 for the left front and rear wheels LF,LR in FIG. 2.

The suspension systems of the independent suspension and propulsion units 36,38,40,42 in the applicator 10 also each include an actively controllable air strut 45, connected between the upper and lower suspension members 43,44. The air struts 45 are used to selectively raise and lower the height of the main frame 12 above the ground surface 14, to thereby facilitate various modes of operation, transport and maintenance of the applicator 10. The air struts 45 also include internal traditional spring and shock absorber suspension components that allow vertical movement of the wheel drive hubs 70,72,74,76 and wheels LF,LR,RF,RR, with respect to the distal ends 50 of the movable axle members 46 and the frame 12, under action of the suspension, as the applicator 10 traverses the ground surface 14.

Figure 3:
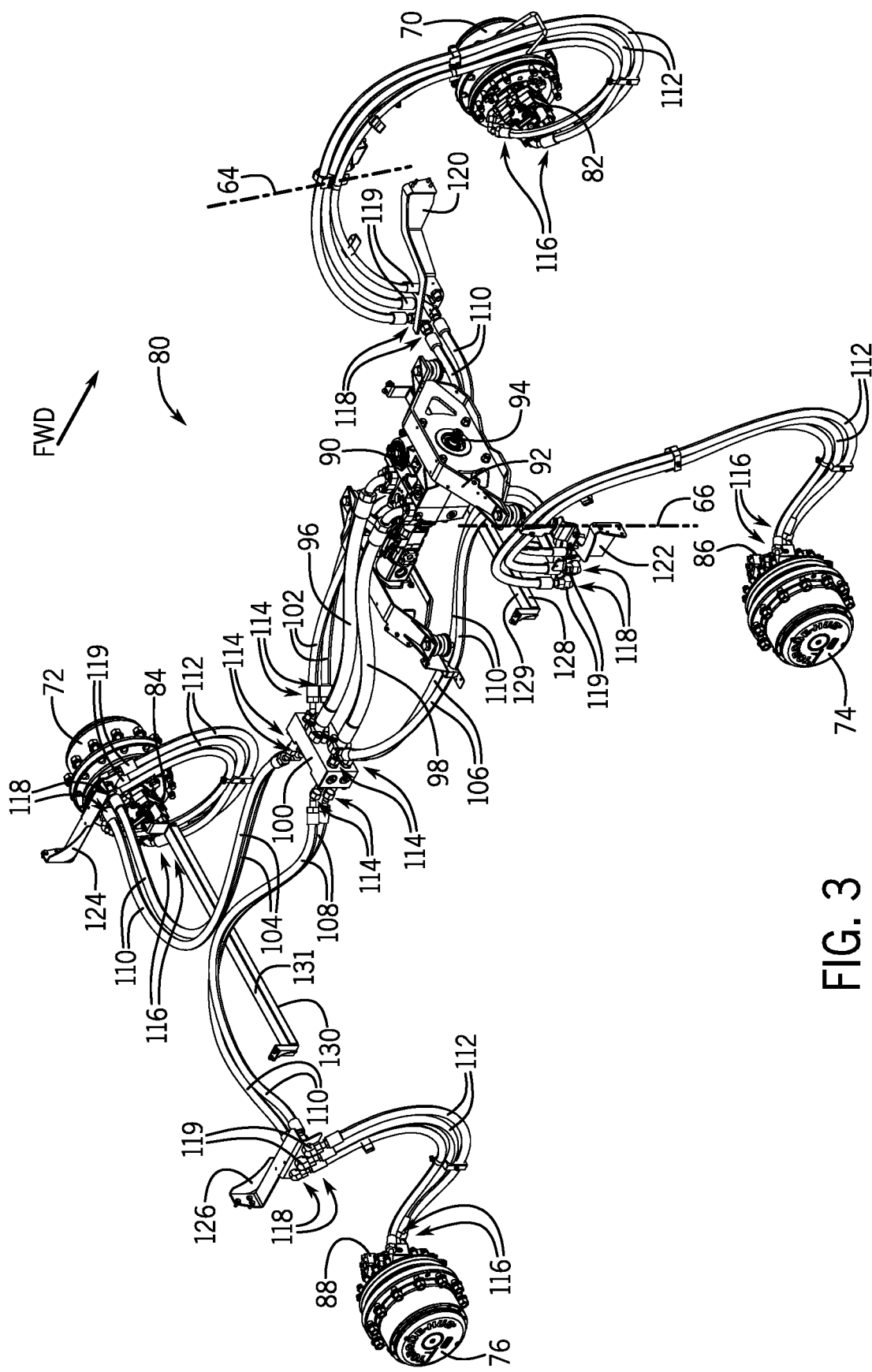
FIG. 3 is an isometric front view of a ground drive hose routing system of the self-propelled agricultural product applicator of FIG. 1.

As shown in FIG. 3, the applicator 10 includes a hose routing system 80, in accordance with the invention, for a series of ground drive hydrostatic hoses, described in greater detail below, that are connected in fluid communication to four variable displacement hydraulic propulsion motors 82,84,86,88 that are each respectively operatively connected to independently drive one of the hubs 70,72,74,76, to thereby independently drive the wheels LF,LR,RF,RR of the applicator 10.

The four variable-displacement hydraulic propulsion motors 82,84,86,88 are connected in fluid communication to a common hydrostatic propulsion pump unit 90, that is mounted to a crossmember 92 of the frame 12, and connected by a drive shaft 94 to be driven by the main engine (not shown) of the applicator 10. The pump unit 90 is connected by a forward supply hose 96 and a reverse supply hose 98 to a common manifold block 100 that is fixedly mounted on a second crossmember (not shown for clarity of illustration) of the frame 12. The propulsion pump unit 90 and the common manifold block 100 thus constitute sources of pressurized hydraulic fluid attached to the frame 12.

The ground drive hose routing system 80 of the exemplary embodiment includes four pairs of hydraulic hose arrangements 102,104,106,108, each consisting of a supply hose and a return hose that run substantially parallel to one another to provide fluid communication between the common manifold 100 on the frame 12 and one of the propulsion motors 82,84,86,88. The function of a particular hose in each of the four pairs of hydraulic hose arrangements 102,104, 106,108 will alternate between being a supply hose or a return hose, depending upon whether the applicator 10 is being driven forward, or in reverse by the hydrostatic propulsion pump unit 90.

In the exemplary embodiment of the applicator 10, each hydraulic hose arrangement in each of the four pairs of hydraulic hose arrangements 102,104,106,108 includes a horizontally constrained movable segment 110 and a vertically constrained movable segment 112 of each particular supply and return hose in a given pair of hydraulic hose arrangements 102,104,106,108. For each respective supply and return hose arrangement, the horizontally constrained segment 110 and the vertically constrained segment 112 are connected in fluid communication with one another in such a manner that movements of that particular hose arrangement in response to horizontal movement 52,54 of the front and rear axle members 46, and vertical movement of the propulsion motors 82,84,86,88 under action of the suspension systems of the independent suspension and propulsion units 36,38,40,42 are isolated from one another.

With continued reference to FIG. 3, each of the supply and return hose arrangements in the four pairs of hydraulic hose arrangements 102,104,106,108 of the exemplary embodiment of the ground drive hose routing system 80 has a first end fixedly attached to the frame, via the common manifold 100, as indicated by arrows 114, a second end fixedly attached to one of the propulsion motors 83,84,86,88, as indicated by arrows 116, and an intermediate hose attachment point, as indicated by arrows 118, disposed between the first and second ends 114,116 of each of the supply and return hose arrangements of the four pairs of hydraulic hose arrangements 102,104,106,108.

In some embodiments of the invention, one or more of the supply and return hose arrangements in the four pairs of hydraulic hose arrangements 102,104,106,108 may extend continuously in a single span of hose between its respective first and second ends, and the intermediate hose attachment point 118 may be defined by the location of a clamp, or some other appropriate arrangement that anchors the continuous span of hose to its respective movable axle member 46 at the intermediate attachment point 118.

In the exemplary embodiment of the applicator 10, however, the intermediate hose attachment points 118 are provided by bulkhead connections, in the form of individual right-angle bulkhead fittings 119 providing fluid communication between the horizontally constrained hose segments 110 and the vertically constrained hose segments 112 at the intermediate connection points 118 of each of the supply and return hose arrangements of the four pairs of hydraulic hose arrangements 102,104,106,108. The right-angle bulkhead fittings 119 for the supply and return hose arrangements of each of the four pairs of hydraulic hose arrangements 102,104,106,108 are respectively mounted on a mounting bracket 120,122,124,126 attached to the movable axle member 46 connecting the propulsion motor 82,84,86,88 served by that pair of hydraulic hose arrangements 102,104,106, 108, to move transversely with the movable axle member 36 to which each bracket 120,122,124,126 is attached.

It is noted that, although the mounting brackets 120,122, 124,126 attached to the movable axle members 46 in the exemplary embodiments all include a vertically oriented flange configured for receiving the right-angle hydraulic fittings 119, other embodiments of the invention may employ one or more brackets having a flange oriented horizontally, or at some other angle for receiving the right-angle fittings 119. Also, in other embodiments of the invention, it is contemplated that alternate approaches for securing the hoses at the intermediate connection points 118 may utilize other types of individual or ganged hydraulic fittings, fluid-directing manifolds, or hose clamping arrangements for securing and/or joining the supply and return hose arrangements of the hose pairs 102,104,106,108 at the intermediate connection points 118.

The exemplary embodiment of the ground drive hose routing system 80 includes a pair of support bars 128,130 fixedly attached to the frame 12 and extending transversely across the underside of the frame 12 for supporting the horizontally constrained movable hose segments 110 in a manner that constrains the horizontally constrained movable segments 110 of the four pairs of hydraulic hose arrangements 102,104,106,108 to lie and move primarily along a substantially horizontal plane extending more-or-less parallel to the horizontal plane defined by the longitudinal and transverse axes 22,24 of the frame 12.

Because the propulsion motors 82,84,86,88 and the intermediate hose attachment points 118 are all mounted on the movable axle members 46, they move together, when the movable axle members 46 are extended or retracted, in such a manner that transverse movement of the movable axle members 46, to adjust track width of the applicator 10, does not result in any relative movement of the vertically constrained hose segments 112. Transverse movement of the movable axle members 46 is essentially completely taken up by flexing and bending movement of the horizontally constrained segments 110 along the horizontal plane defined by the front and rear support bars 128,130.

Because the ground drive hoses in a typical self-propelled agricultural product applicator are generally of substantial diameter and reinforced to handle the flow rates and high pressures required for propelling the applicator, and to be rugged enough for use in agricultural environments, these hoses are typically quite stiff. As a result, the front and rear support bars 128,130 in the exemplary embodiment of the applicator 10 have been found to provide adequate support to constrain the horizontally constrained hose segments 110 to lie and move along a substantially horizontal plane. In other embodiments of the invention, it is conceived that other forms of support bars, plates, or brackets may also be used with efficacy for constraining the horizontally constrained hose segments 110 to lie and move along a substantially horizontal plane.

As indicated in FIG. 3, the front and rear support bars 128,130 of the exemplary embodiment of the applicator 10 each have respective upper surfaces 129,131 that include a plastic sliding surface to reduce wear on the hoses and the support bars 128,130, and to facilitate flexing and bending of the horizontally constrained hose segments 110 as they lie and move along the horizontal plane. In other embodiments of the invention, other surface treatments may be applied to the upper surfaces 129,131 of the support bars 128,130. Such other surface treatments might include, for example, using other durable, wear-resistant materials attached to the support bars 128,130, or utilizing wear resistant coatings or sleeves on the support bars 128,130 and/or the hoses in areas where the hoses contact the support bars 128,130.

Locating the intermediate hose attachment points 118 and the propulsion motors 82,84,86,88 on the movable axle member also results in constraining the vertically movable segments 112 of the hose arrangements to lie and move primarily along a substantially vertical plane, to thereby isolate movements of the horizontally constrained segments 10 of the hose arrangements in response to horizontal transverse movement of the movable axle members 46, from movements of the vertically constrained segments 112 of the hose arrangements in response to vertical movement 78 of the propulsion motors 82,84,86,88 under action of the suspension members of the independent suspension and propulsion units 36,38,40,42.

Figure 4:
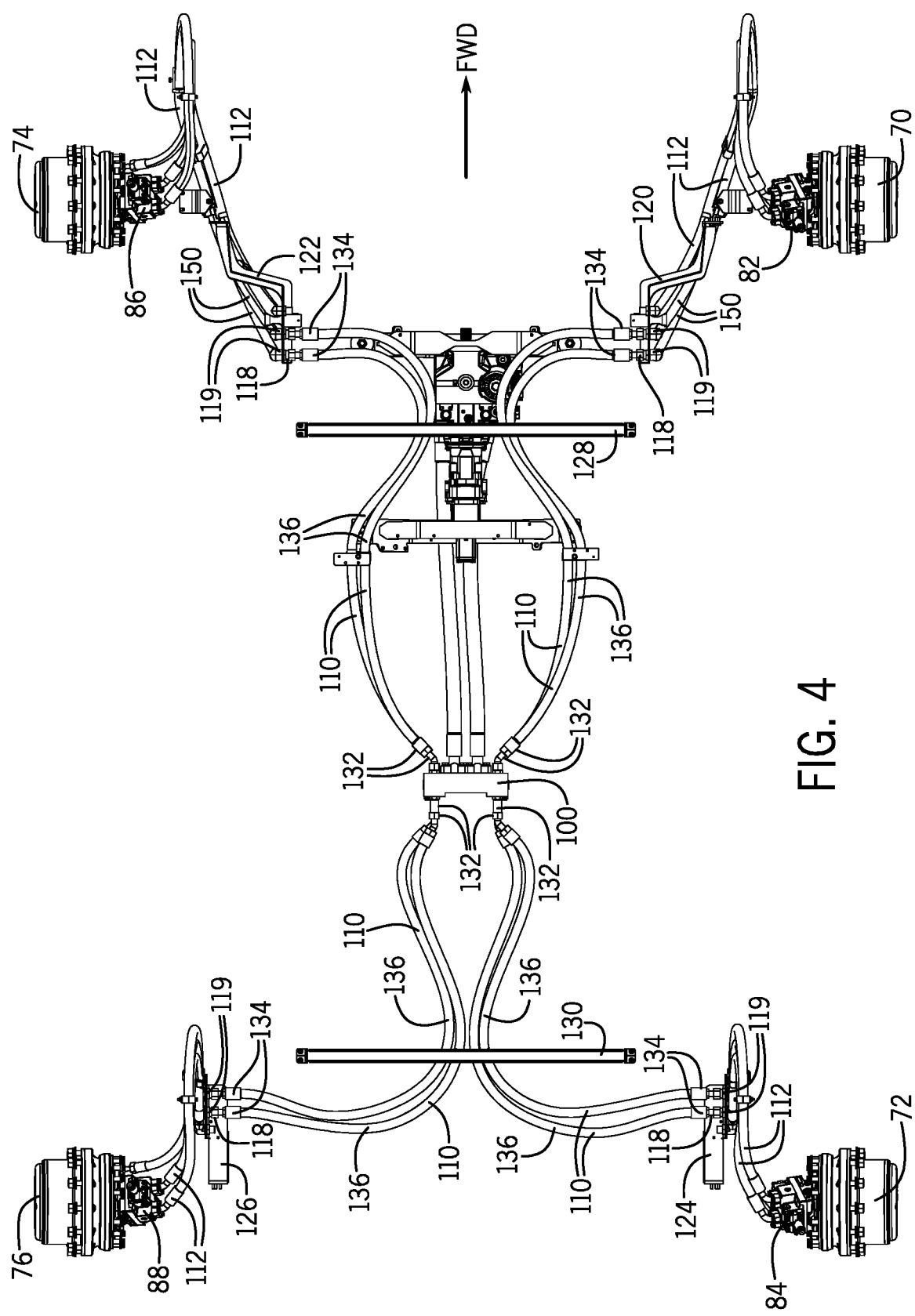
FIG. 4 is bottom orthographic view of the ground drive hose routing system of the self-propelled agricultural product applicator of FIG. 3.
Figure 5:
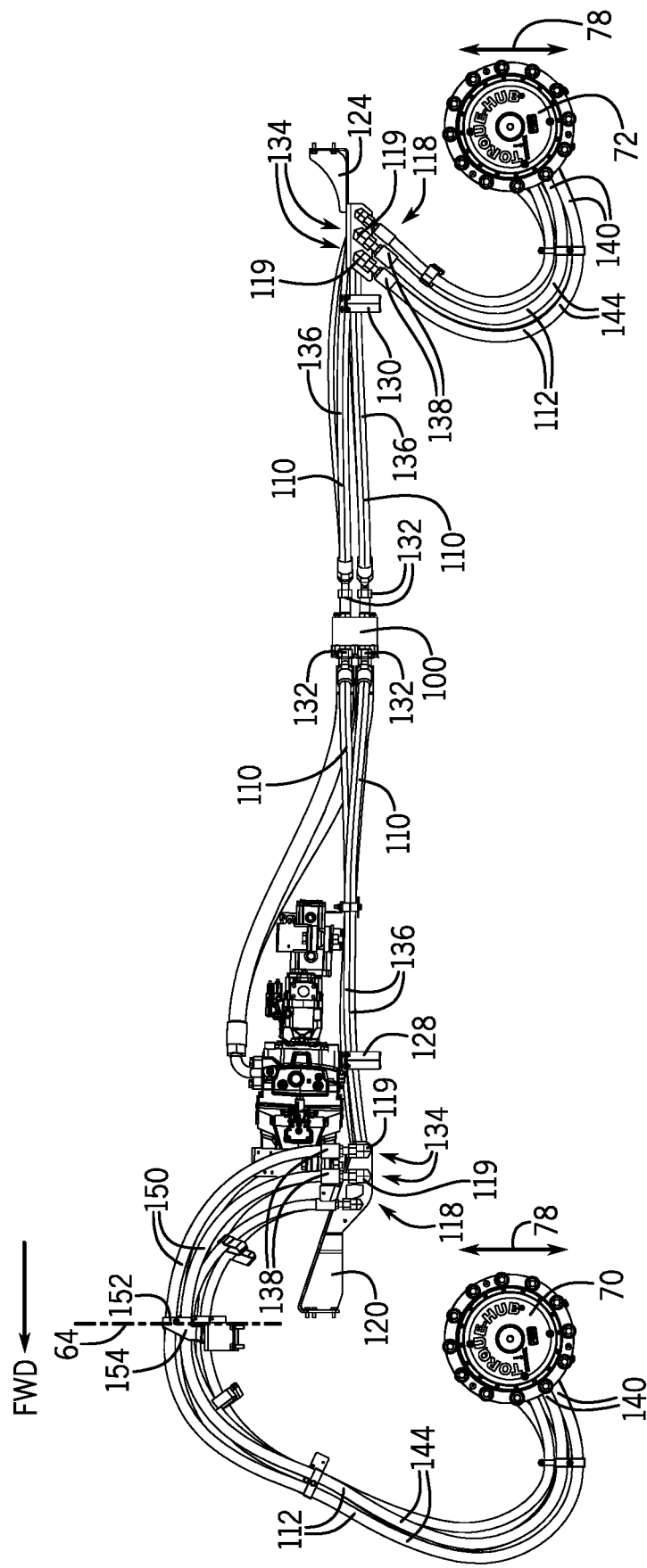
FIG. 5 is an orthographic left-side view of the ground drive hose routing system of the self-propelled agricultural product applicator of FIG. 3.

As shown in FIGS. 4 and 5, in the exemplary embodiment, the horizontally and vertically constrained hose segments 110,112, are separate hose arrangements, joined together at the intermediate connection points 118 by the right-angle bulkhead fittings 119. Each of the horizontally constrained movable hose segments 110 has a first end 132 fixedly attached to the frame 12 via the common manifold 100, and a second end 134 fixedly attached to the movable axle member 46 at one of the hose connection point 118 for transverse movement of the second ends 134 of the horizontally constrained movable hose segments 110 with the movable axle member 46, relative to the frame 12. The horizontally constrained hose segments each also have a length 136 thereof constrained to lie and move in a direction substantially parallel to the horizontal plane defined by the longitudinal and transverse axes 22,24 of the frame 12.

In similar fashion, as illustrated in FIG. 5 for the left front and left rear drive hubs, in the exemplary embodiment of the applicator 10, each substantially vertically constrained movable hose segment 112 has a first end 138 fixedly attached to the movable axle member 46 by a bulkhead fitting 119 at one of the hose attachment points 118, and a second end 140 fixedly attached for vertical movement 78 of the second end 140 of the vertically constrained movable hose segment 112 with respect to the movable axle member 46 and the frame 12. Each vertically constrained hose segment 112 also has a length 144 thereof constrained to lie and move in a direction substantially perpendicular to the horizontal plane defined by the longitudinal and transverse axes 22,24 of the frame 12.

The first end 138 of each of the vertically constrained hose segments 112 is connected in fluid communication at the hose attachment point 118, using one of the right-angle bulkhead fittings 119, with the second end 134 of its corresponding horizontally constrained hose segment 110, and the second end 140 of each vertically constrained hose segment 112 is connected in fluid communication its respective propulsion motor 82,84,86,88, in such a manner that the ground drive hose routing system 80 provides separate channels of fluid communication between the common manifold 100 and each of the propulsion motors 82,84,86, 88.

The right-angle bulkhead fittings 119 provide a convenient transition between the horizontally constrained segments 110 to the vertically constrained segments 112, and help to isolate and orient the horizontally and vertically constrained hose segments 110,112 to lie and move along their respective horizontal and vertical planes.

As also indicated in FIGS. 3-5, the mounting brackets 124,126 for the rear wheels LR,RR are configured to locate the hose attachment points 118 for the rear wheels LR,RR behind the movable axle members 46 for the rear wheels LR,RR. The mounting brackets 120,122 for the front wheels LF,RF are configured to locate the hose attachment points 118 for the front wheels LF,RF forward of the movable axle members 46 for the front wheels LF,RF. As illustrated in FIG. 4, the mounting brackets 120,122 for the front wheels LF,RF are also further configured to have an offset, dog-legged shape when viewed in both horizontal and vertical directions to optimize placement of the intermediate hose attachment points 118 for isolating the horizontally and vertically constrained hose segments 110,112 to lie and move along their respective horizontal and vertical planes.

As further shown in FIGS. 3-5, the vertically constrained hose segments 112 of the rear wheels LR,RR are directed downward in a single smooth curved path between the right-angle bulkhead fittings 119 at the rear intermediate hose attachment points 118 and the left and right rear propulsion motors 84,88. Because the rear vertically constrained hose segments 112 are isolated from the effects of transverse, horizontal movement of the movable axle members 46, and are constrained in the manner described above to lie and move along only a vertical plane, the rear wheel vertically constrained hose segments 112 can advantageously have shorter lengths than were achievable in prior ground drive hose routing systems, and be aligned and constrained in a manner providing increased ground clearance and minimal potential interference with standing row crops passing under the frame 12 of the applicator 10.

The invention as described thus far may be practiced with both non-steerable and steerable wheels, of a self-propelled agricultural product applicator 10.

As shown in FIG. 5, to provide additional isolation of the horizontally constrained hose segments 110 from the vertically constrained hose segments 112 of the front, steerable wheels LF,RF of the exemplary embodiment of the applicator 10, the vertically constrained hose segments 112 of the front pairs 102,106 of supply and return hose arrangements are further configured to provide pivotable hose segments 150 disposed between the horizontally and vertically constrained movable segments 110,112 of the supply and return hose arrangements for the front wheels LF,RF. This is especially advantageous in practicing the invention with steerable wheels.

As illustrated in FIG. 5, the vertically constrained segments 112 of the front wheel supply and return hose arrangements are initially routed upward by orientation of the right-angle bulkhead fittings 119, from the intermediate hose attachment points 118 attached to the front movable axle members 46, and then looped downward in a single smooth partial loop to substantially pass through the respective steering axis 64,66 for one of the front wheels LF,RF to the respective front wheel propulsion motor 82,86 associated with a respective pair of vertically constrained hose segments 112. The vertically constrained hose segments 112 serving each of the front wheels LF,RF are also attached to their respective movable front axle 46 by a steering axis bracket arrangement 152 at a second hose attachment point 154 adjacent its steering axis 64,66, to thereby define the pivotable hose segments 150 of the supply and return hose arrangements serving the front wheel propulsion motors 82,86 as those sections 150 of the vertically constrained segments 112 of the supply and return hose arrangements extending between the first intermediate hose attachment points 118 and the second intermediate hose attachment points 154.

By virtue of this arrangement, it will be appreciated that the pivotable hose segments 150 are configured and constrained to pivotably accommodate movement of the pivotable segments 150 in response to steering movement of the front independent suspension and propulsion units 36,40, in a manner that isolates the remainder of the vertically constrained front wheel hose segments 112 so that they can continue to lie and move only substantially along a vertically oriented plane. The addition of the pivotable sections 150 for the steerable wheels LF,RF in accordance with the invention, as described above in relation to the exemplary embodiment of the applicator 10, also maintains isolation of the horizontally constrained movable hose segments 110 serving the front wheels LF,RF to lie and move only along a substantially horizontal plane.

In some embodiments of the invention, it is contemplated that the vertically constrained hose segments may be fixedly clamped to the steering axis bracket arrangement 152 at the second hose attachment point 154 to thereby define the pivotable hose segments 150, and provide the desired pivotable transition to maintain isolation in the front, steerable wheels LF,RF between the horizontally and vertically constrained hose segments 110,112 serving the steerable wheels LF,RF. In the exemplary embodiment of the applicator 10, however a swiveling hose clamp arrangement 162, described in more detail below with reference to FIG. 6, is used to clamp the vertically constrained movable hose segments 112 at the second hose attachment point.

Figure 6:
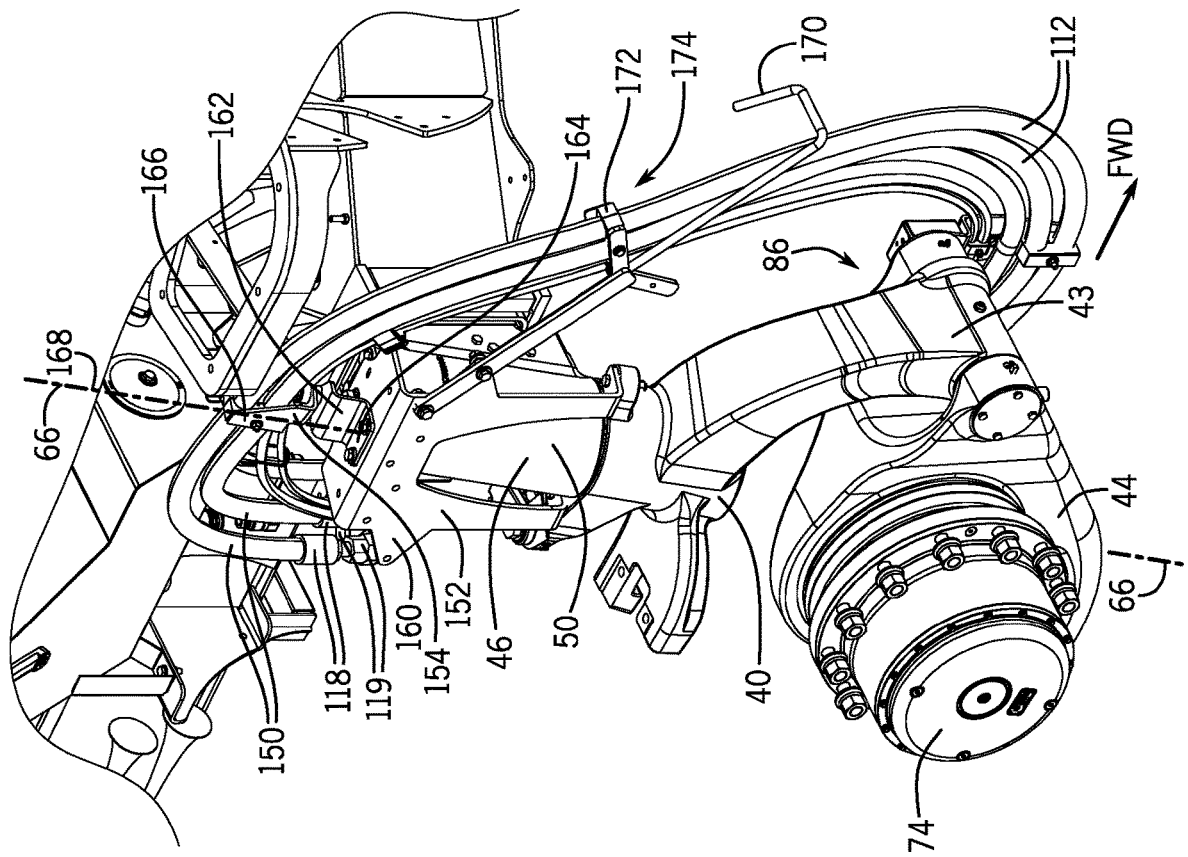
FIG. 6 is an isometric front view of a right front corner of the frame, and front right suspension and propulsion units of FIG. 2, and associated elements of the ground drive hose routing system shown in FIGS. 3-5 of the exemplary embodiment of the applicator shown in FIG. 1.

FIG. 6 provides additional detail for swiveling hose clamp arrangements 162 and the steering axis bracket arrangements 152 utilized at the front wheels LF,RF of exemplary embodiment of the applicator 10 for securing the vertically constrained hose segments 112 at second hose attachment points 154 adjacent the steering axes 64,66, to create the pivotable sections 150 of the supply and return hose arrangements of the drive hose pairs 102,104 serving the propulsion motors 82,84 of the front wheels LF,RF.

Since identical steering axis brackets 152 are used for the left and right front wheels LF,RF of the applicator 10, the following description, which is specifically directed to the steering axis bracket associated with the right front wheel RF, will also be understood to illustrate the steering axis bracket 152 at the left front wheel LF and its attachment.

As shown in FIG. 6, each of the steering axis bracket arrangements 152 in the applicator 10 includes a base bracket 160, and a swiveling hose clamp arrangement 162. The base bracket 160 for the right front wheel RF is fixedly mounted on the upper member 43 of the suspension and propulsion unit 40 of the right front wheel RF, and extends upward and over the distal end 50 of the movable axle member 46 of the right front wheel RF. Because the upper member 43 of the suspension and propulsion unit 40 does not move vertically with respect to the distal end 50 of the movable axle member 46, to which the vertically constrained movable hose segments 112 for the right front wheel RF are attached at the intermediate hose attachment points 118 and at the second hose attachment points 154, the bracket base 160 does not move vertically with respect to the frame 12, the movable axle member 46, or the intermediate or second hose attachment points 118, 154.

The base bracket 160 pivots with the upper member of the suspension and propulsion unit 40 about the steering axis 66, in relation to the non-pivoting distal end 50 of the movable axle member 46 and the intermediate hose attachment points 118 attached to the movable axle member 46 of the front right wheel RF.

The swiveling hose clamp arrangement 162 of the steering axis bracket arrangement 152 includes a base 164 and a pivotable hose clamping arrangement 166 that is pivotably attached for rotation about a pivot axis 168 of the swiveling hose clamp arrangement 162. The base 164 of the swiveling hose clamp arrangement is adapted for fixed attachment to the base bracket 160 of the steering axis bracket arrangement 152 in a manner that substantially aligns the pivot axis 168 of the swiveling hose clamp arrangement 162 and the pivotable hose clamping arrangement 166 for rotation about the steering axis 66. The pivotable hose clamping arrangement 166 is configured to secure the vertically constrained movable hose segments 112 at the second hose attachment point 154, to thereby define the pivotable hose segments 150 serving the right front wheel RF.

It will be appreciated that the swiveling hose clamp arrangement 162 allows the hoses to pivot somewhat at the second hose attachment points 154, to thereby smooth the transition between the pivotable segments 150 and the remainder of the vertically constrained movable hose segments 112, under steering action of the front wheels LF,RF, while still essentially isolating the remainder of the vertically constrained movable hose segments 112 to lie in and move along a vertical plane. It will also be appreciated that, as stated above, in other embodiments of the invention, the swiveling hose clamp arrangements 162 may be replaced with other arrangements for fixedly or pivotably securing the hose segments 112,150 to the bracket base 160 of the steering axis clamping arrangement 162.

As further illustrated in FIG. 6, the exemplary embodiment of the applicator 10 includes additional clamping and guiding elements 170 that are fixedly attached to the suspension and propulsion unit 40, for constraining and guiding the remainders of the vertically constrained movable hose segments 112 of the front wheels LF,RF to lie in and move along a vertical plane, substantially isolated from steering motion of the front wheels LF,RF by the pivotable segments 150.

In the exemplary embodiment of the applicator 10, the additional clamping and guiding elements 170 include a clamping arrangement 172 that fixedly attaches the vertically constrained hose segments 112 serving the front wheels LF,RF to the pivotable upper suspension members 43 of the front suspension and propulsion units 36,30. By virtue of this arrangement, a third intermediate hose attachment point 174 is defined by the clamping arrangement 172, such that the effective length of the pivotable hose segments 150 is increased, to extend from the first intermediate hose attachment points 118, through the swiveling hose clamp arrangements 162 at the second intermediate hose attachment points 154, all the way to the third intermediate attachment points 174.

The addition of the third intermediate attachment point 174, in combination with the swiveling hose clamp 162 at the second intermediate attachment point 154 provides significant advantages over embodiments of the invention in which the vertically constrained hose segments are fixedly clamped to the steering axis hose brackets 152, and also over embodiments of the invention in which the swiveling hose clamp 162 is used without the third intermediate attachment point 174. Without the third intermediate hose attachment points 174, the pivotable hose segments 150 between the first and second intermediate hose attachment points 118, 154 would need to have additional length to provide enough slack for proper turning movement of the front wheels LF,RF, without overstressing the pivotable hose segments 150. This additional length is undesirable for a number of reasons. For example, longer hoses in this area would tend to flex and sway when the applicator 10 is not turning, which would inherently increase stress and wear on the pivotable hose segments 150. If the range of flexing motion were great enough to cause the pivotable hose segments 150 to contact the frame 12, the wheels LF,RF, or other parts of the applicator 10 such as fenders, the possibility of wear could potentially be exacerbated. Also, having the pivotable hose segments 150 be shorter, through use of the third intermediate attachment points 174, allows fenders and other components of the applicator 10 to be positioned more effectively and efficiently in the space around the front wheels LF,RF.

As illustrated in several of the drawing figures, additional fluid lines and wire harnesses associated with the independent suspension and propulsion units 36,38,40,42 of the exemplary embodiment of the applicator 10 may also be routed with, or in similar fashion to the supply and return hoses described in the exemplary embodiments. Such additional fluid lines and wire harnesses may include related hydraulic lines, such as case drain lines for each of the propulsion motors 82,84,86,88, brake lines connected to the drive hubs, and cables or harnesses for electrical, pneumatic or other control and monitoring devices associated with the independent suspension and propulsion units 36,38,40,42.

Those having skill in the art will appreciate that, in the above described exemplary embodiments of the applicator 10 having and ground drive hose routing arrangement 80, the supply and return hose arrangements in the pairs of 102,104,16,108 can be shorter and more uniformly and neatly installed than in prior applicators, thereby providing considerable improvements over prior approaches. In addition, twisting and tangling of the hoses, and potential interference with standing crops, as experienced in some prior applicators, is substantially eliminated.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

I claim:

1. A ground drive hose routing system for a self-propelled agricultural product applicator having a source of pressurized hydraulic fluid mounted on an applicator main frame supported above a ground surface by a ground engaging wheel operatively connected to the frame by an independent suspension and propulsion unit mounted on a horizontally movable axle member for adjusting track width of the wheel, the suspension and propulsion unit also having a hydraulic propulsion motor that is movable horizontally with respect to the frame under action of the movable axle, and movable vertically with respect to both the frame and the movable axle member under action of the suspension, the ground drive hose routing system comprising:

a hydraulic hose arrangement connected in fluid communication between the source of hydraulic fluid on the frame and the propulsion motor on the independent suspension and propulsion unit;

the hydraulic hose arrangement also defining a horizontally constrained movable segment and a vertically constrained movable segment of the hose arrangement;

the horizontally constrained segment and the vertically constrained segment being connected in fluid communication with one another in such a manner that movements of the hose arrangement in response to horizontal movement of the axle member, and vertical movement of the propulsion motor under action of the suspension are isolated from one another.

2. The ground drive hose routing system of claim 1, wherein the hose arrangement has a first end fixedly attached to the frame, a second end fixedly attached to the propulsion motor, and an intermediate hose attachment point disposed between the first and second ends of the hose arrangement and attached to the movable axle member in a manner constraining the horizontally constrained movable segment of the hose arrangement to lie and move primarily along a substantially horizontal plane, and also constraining the vertically movable segment of the hose arrangement to lie and move primarily along a substantially vertical plane, to thereby isolate movements of the hose arrangement in response to horizontal movement of the axle member from movements of the hose arrangement in response to vertical movement of the propulsion motor under action of the suspension.

3. The ground drive hose routing system of claim 2, wherein:
the frame defines substantially perpendicular longitudinal and transverse axes of the frame and applicator, with the longitudinal and transverse axes extending respectively between front and rear ends and left and right sides of the applicator, such that the longitudinal and transverse axes define a horizontal plane extending substantially parallel to a level ground surface under the applicator;
the movable axle member has proximal and distal ends thereof, with the proximal end being adapted for transversely movable engagement with the frame;
the hydrostatic propulsion motor is operatively connected to the distal end of the movable axle by a vertically movable independent suspension system operatively connecting the wheel and propulsion motor to the distal end of the movable axle member in a manner providing for vertical movement of the wheel and propulsion motor with respect to the distal end of the movable axle element and the frame.

4. The ground drive hose routing system of claim 3, wherein:
the horizontally constrained movable hose segment has a first end fixedly attached to the frame, and a second end fixedly attached to the movable axle member at the hose connection point for transverse movement of the second end of the transversely movable hose segment with the movable axle member relative to the frame; and
the horizontally constrained hose segment also has a length thereof constrained to lie and move in a direction substantially parallel to the horizontal plane defined by the longitudinal and transverse axes of the frame.

5. The ground hose routing system of claim 3, wherein:
the substantially vertically constrained movable hose segment has a first end fixedly attached to the movable axle member at the hose attachment point, and a second end fixedly attached for vertical movement of the second end of the vertically movable hose segment with respect to the movable axle member and the frame; and
the vertically constrained hose segment also has a length thereof constrained to lie and move in a direction substantially perpendicular to the horizontal plane defined by the longitudinal and transverse axes of the frame.

6. The ground drive hose routing system of claim 3, wherein:
the horizontally constrained movable hose segment has a first end fixedly attached to the frame, and a second end fixedly attached to the movable axle member at the hose connection point for transverse movement of the second end of the transversely movable hose segment with the movable axle member relative to the frame;
the horizontally constrained hose segment also has a length thereof constrained to lie and move in a direction substantially parallel to the horizontal plane defined by the longitudinal and transverse axes of the frame;
the substantially vertically constrained movable hose segment has a first end fixedly attached to the movable axle member at the hose attachment point, and a second end fixedly attached for vertical movement of the second end of the vertically movable hose segment with respect to the movable axle member and the frame;
the vertically constrained hose segment also has a length thereof constrained to lie and move in a direction substantially perpendicular to the horizontal plane defined by the longitudinal and transverse axes of the frame;
the first end of the horizontally constrained hose segment is adapted for fluid connection to the source of pressurized hydraulic fluid;
the first end of the vertically constrained hose segment being connected in fluid communication at the hose attachment point with the second end of the vertically constrained hose segment; and
the second end of the vertically constrained hose segment is connected in fluid communication to the propulsion motor, in such a manner that the ground drive hose routing system provides fluid communication between the source of pressurized hydraulic fluid and the propulsion motor.

7. The ground drive hose routing system of claim 1, wherein the hydraulic hose arrangement further includes a pivotable hose segment disposed between the horizontally and vertically constrained movable segments of the hose arrangement.

8. The ground drive hose routing system of claim 7, wherein the independent suspension and propulsion system is pivotably connected to the movable axle at a steering axis such that the wheel is steerable, and the vertically constrained segment of the hose arrangement is routed to substantially pass through the steering axis and be attached to the independent suspension and propulsion system at a second hose attachment point adjacent the steering axis, to thereby define the pivotable hose segment of the hose arrangement.

9. The ground drive hose routing system of claim 8, wherein the second hose attachment point is disposed above the first hose attachment point, such that the pivotable and vertically constrained hose segments substantially loop upward over the movable axle and through the steering axis between the first hose attachment point and the propulsion motor.

10. A self-propelled agricultural product applicator having a source of pressurized hydraulic fluid mounted on an applicator main frame supported above a ground surface by a ground engaging wheel operatively connected to the frame by an independent suspension and propulsion unit mounted on a horizontally movable axle member for adjusting track width of the wheel and having a hydraulic propulsion motor that is movable horizontally with respect to the frame under action of the movable axle, and movable vertically with respect to both the frame and the movable axle member under action of the suspension, and a ground drive hose routing system comprising:
a hydraulic hose arrangement connected in fluid communication between the source of hydraulic fluid on the frame and the propulsion motor on the independent suspension and propulsion unit;

the hydraulic hose arrangement also defining a horizontally constrained movable segment and a vertically constrained movable segment of the hose arrangement;

the horizontally constrained segment and the vertically constrained segment being connected in fluid communication with one another in such a manner that movements of the hose arrangement in response to horizontal movement of the axle member, and vertical movement of the propulsion motor under action of the suspension are isolated from one another.

11. The self-propelled applicator of claim 10, wherein the hose arrangement has a first end fixedly attached to the frame, a second end fixedly attached to the propulsion motor, and an intermediate hose attachment point disposed between the first and second ends of the hose arrangement and attached to the movable axle member in a manner constraining the horizontally constrained movable segment of the hose arrangement to lie and move primarily along a substantially horizontal plane, and also constraining the vertically movable segment of the hose arrangement to lie and move primarily along a substantially vertical plane, to thereby isolate movements of the hose arrangement in response to horizontal movement of the axle member from movements of the hose arrangement in response to vertical movement of the propulsion motor under action of the suspension.

12. The self-propelled applicator of claim 11, wherein:

the frame defines substantially perpendicular longitudinal and transverse axes of the frame and applicator, with the longitudinal and transverse axes extending respectively between front and rear ends and left and right sides of the applicator, such that the longitudinal and transverse axes define a horizontal plane extending substantially parallel to a level ground surface under the applicator;

the movable axle member has proximal and distal ends thereof, with the proximal end being adapted for transversely movable engagement with the frame;

the hydrostatic propulsion motor is operatively connected to the distal end of the movable axle by a vertically movable independent suspension system operatively connecting the wheel and propulsion motor to the distal end of the movable axle member in a manner providing for vertical movement of the wheel and propulsion motor with respect to the distal end of the movable axle element and the frame.

13. The self-propelled applicator of claim 12, wherein:

the horizontally constrained movable hose segment has a first end fixedly attached to the frame, and a second end fixedly attached to the movable axle member at the hose connection point for transverse movement of the second end of the transversely movable hose segment with the movable axle member relative to the frame;

the horizontally constrained hose segment also has a length thereof constrained to lie and move in a direction substantially parallel to the horizontal plane defined by the longitudinal and transverse axes of the frame;

the substantially vertically constrained movable hose segment has a first end fixedly attached to the movable axle member at the hose attachment point, and a second end fixedly attached for vertical movement of the second end of the vertically movable hose segment with respect to the movable axle member and the frame;

the vertically constrained hose segment also has a length thereof constrained to lie and move in a direction substantially perpendicular to the horizontal plane defined by the longitudinal and transverse axes of the frame;

the first end of the horizontally constrained hose segment is adapted for fluid connection to the source of pressurized hydraulic fluid;

the first end of the vertically constrained hose segment being connected in fluid communication at the hose attachment point with the second end of the vertically constrained hose segment; and the second end of the vertically constrained hose segment is connected in fluid communication to the propulsion motor, in such a manner that the ground drive hose routing system provides fluid communication between the source of pressurized hydraulic fluid and the propulsion motor.

14. The self-propelled applicator of claim 10, wherein the hydraulic hose arrangement further includes a pivotable hose segment disposed between the horizontally and vertically constrained movable segments of the hose arrangement.

15. The self-propelled applicator of claim 14, wherein the independent suspension and propulsion system is pivotably connected to the movable axle at a steering axis such that the wheel is steerable, and the vertically constrained segment of the hose arrangement is routed to substantially pass through the steering axis and be attached to the independent suspension and propulsion system at a second hose attachment point, to thereby define the pivotable hose segment of the hose arrangement.

16. The self-propelled applicator of claim 15, wherein the second hose attachment point is disposed above the first hose attachment point, such that the vertically pivotable and vertically constrained hose segments substantially loop upward over the movable axle and through the steering axis between the first hose attachment point and the propulsion motor.

17. A method for routing a ground drive hydrostatic hose in a self-propelled agricultural product applicator having a source of pressurized hydraulic fluid mounted on an applicator main frame supported above a ground surface by a ground engaging wheel operatively connected to the frame by an independent suspension and propulsion unit mounted on a horizontally movable axle member for adjusting track width of the wheel and having a hydraulic propulsion motor that is movable horizontally with respect to the frame under action of the movable axle, and movable vertically with respect to both the frame and the movable axle member under action of the suspension, the method comprising:

connecting a hydraulic hose arrangement in fluid communication between the source of hydraulic fluid on the frame and the propulsion motor on the independent suspension and propulsion unit in such a manner that the hydraulic hose arrangement defines a horizontally constrained movable segment and a vertically constrained movable segment of the hose arrangement; and further connecting the horizontally constrained segment and the vertically constrained segment in fluid communication with one another in such a manner that movements of the hose arrangement in response to horizontal movement of the axle member, and vertical movement of the propulsion motor under action of the suspension are isolated from one another.

18. The method for routing a ground drive hydrostatic hose in a self-propelled agricultural product applicator of claim 17, wherein the hose arrangement has a first end fixedly attached to the frame, a second end fixedly attached to the propulsion motor, and an intermediate hose attachment point disposed between the first and second ends of the hose arrangement and attached to the movable axle member in a manner constraining the horizontally constrained movable segment of the hose arrangement to lie and move primarily along a substantially horizontal plane, and also constraining the vertically movable segment of the hose arrangement to lie and move primarily along a substantially vertical plane, to thereby isolate movements of the hose arrangement in response to horizontal movement of the axle member from movements of the hose arrangement in response to vertical movement of the propulsion motor under action of the suspension.

19. The method for routing a ground drive hydrostatic hose in a self-propelled agricultural product applicator of claim 17, further comprising configuring the hydraulic hose arrangement to also include a pivotable hose segment disposed between the horizontally and vertically constrained movable segments of the hose arrangement.

20. The method for routing a ground drive hydrostatic hose in a self-propelled agricultural product applicator of claim 19, wherein the independent suspension and propulsion system is pivotably connected to the movable axle at a steering axis such that the wheel is steerable, and the method further includes routing the vertically constrained segment of the hose arrangement to substantially pass through the steering axis and be attached to the independent suspension and propulsion system at a second hose attachment point adjacent the steering axis, to thereby define the pivotable hose segment of the hose arrangement.

* * * * *